US011943287B2

(12) United States Patent
De La Rocha Gómez-Arevalillo et al.

(10) Patent No.: US 11,943,287 B2
(45) Date of Patent: Mar. 26, 2024

(54) METHOD AND SYSTEM FOR ENHANCED PERFORMANCE OF DLT NETWORKS

(71) Applicant: Telefónica IoT & Big Data Tech, S.A., Madrid (ES)

(72) Inventors: Alfonso De La Rocha Gómez-Arevalillo, Madrid (ES); María Teresa Nieto Galán, Madrid (ES); Jose Luis Núñez Diaz, Madrid (ES)

(73) Assignee: Telefónica IoT & Big Data Tech, S.A., Madrid (ES)

( * ) Notice: Subject to any disclaimer, the term of this patent is extended or adjusted under 35 U.S.C. 154(b) by 0 days.

(21) Appl. No.: 18/013,570

(22) PCT Filed: Jun. 29, 2021

(86) PCT No.: PCT/EP2021/067905
§ 371 (c)(1),
(2) Date: Dec. 29, 2022

(87) PCT Pub. No.: WO2022/002969
PCT Pub. Date: Jan. 6, 2022

(65) Prior Publication Data
US 2023/0319136 A1 Oct. 5, 2023

(30) Foreign Application Priority Data

Jun. 30, 2020 (EP) ..................................... 20382582

(51) Int. Cl.
*H04L 67/104* (2022.01)

(52) U.S. Cl.
CPC ................................. *H04L 67/104* (2013.01)

(58) Field of Classification Search
None
See application file for complete search history.

(56) References Cited

U.S. PATENT DOCUMENTS

2010/0161817 A1* 6/2010 Xiao ................... H04L 67/1046
709/229
2023/0085773 A1* 3/2023 Mateos Sole ............. H04L 9/50
713/155

OTHER PUBLICATIONS

International Search Report and the Written Opinion Dated Sep. 23, 2021 From the International Searching Authority Re. Application No. PCT/EP2021/067905. (8 Pages).

(Continued)

*Primary Examiner* — James A Edwards

(57) ABSTRACT

It is proposed a technical solution to leverage the characteristics and generally speaking, the performance of DLT networks. This solution proposes building a federation of DLT networks which work together regardless of the underlying technologies to guarantee data consistency, wider consensus and enhanced trust. The proposed solution includes, among others, a distributed transport mechanism for the exchange of control data between the different networks of the federation; and the spread and storage of "proofs of history" of the network to protect and validate the connected networks integrity.

14 Claims, 7 Drawing Sheets

(56) References Cited

OTHER PUBLICATIONS

Abadi et al. "Blockchain Economics", National Bureau of Economic Research, NBER, Working Paper, w25407: 1-46, Dec. 29, 2021.
Laurie et al. "Revocation Transparency", Google Research, 33: Sep. 1-3, 2012.
Lum et al. "Compact Merkle Multiproofs", ArXiv Preprint ArXiv:2002.07648v1, XP081602328, p. 1-4, Feb. 18, 2020.
Robinson "Consensus for Crosschain Communications", ARXiv Preprint ArXiv:2004.09494.v1, XP081648914, p. 1-15, Apr. 18, 2020.

* cited by examiner

METHOD AND SYSTEM FOR ENHANCED PERFORMANCE OF DLT NETWORKS

RELATED APPLICATIONS

This application is a National Phase of PCT Patent Application No. PCT/EP2021/067905 having International filing date of Jun. 29, 2021, which claims the benefit of priority of European Patent Application No. 20382582.3 filed on Jun. 30, 2020. The contents of the above applications are all incorporated by reference as if fully set forth herein in their entirety.

FIELD AND BACKGROUND OF THE INVENTION

The present invention relates to interoperating DLT (Distributed Leger Technology) networks and more particularly, to a method and system to enhance performance of DLT networks, by providing a DLT architecture with several independent and heterogeneous interoperating (federated) DLT networks.

A distributed ledger (also called a shared ledger or distributed ledger technology, DLT) imply a consensus of replicated, shared a synchronized digital data across multiple nodes. There is no central administrator or centralized data storage. The distributed ledger database is spread across several nodes (devices) on a peer-to-peer network, where each replicates and saves an identical copy of the ledger (data) and updates itself independently. When a ledger update happens, each node constructs the new transaction, and then the nodes vote by consensus algorithm on which copy is correct. Once a consensus has been determined, all the other nodes update themselves with the new, correct copy of the ledger (security is accomplished through cryptographic keys and signatures). The participant nodes (electronic devices) of a distributed ledger may apply an agreed protocol for verifying, storing, maintaining and modifying data stored in the distributed ledger. One form of distributed ledger design is the blockchain system; that is, it can be said that the blockchain technology is a type of DLT.

One of the current limitations of DLT technologies is that there is no single DLT solution that fits all the use cases; so, more and more vertical isolated solutions are appearing lacking interoperability between them. Each of these deployments use a different underlaying protocol, and they are of a different nature, for example, public networks which comprise a large number of nodes, low performance and higher levels of trust than permissioned and private networks with a small number of nodes, lowers levels of trust but higher transaction throughputs. Hence, nowadays one of the main issues of DLT is the lack of interoperability between different DLT networks using different underlying protocols and/or technologies.

Generally, ledgers have always been centralized until the appearance of DLT technologies. The ideal features of any ledger, regardless centralized or decentralized, are correctness, cost efficiency and level decentralization. There exists a trilemma in DLT technologies which from these three characteristics only two can be chosen. For instance, a DLT technology offering decentralization and correctness cannot also be cost efficient. Thus, a proof of work-based network will be decentralized and correct but not cost efficient, while a proof of authority system will be correct and cost efficient but with a low level of decentralization (as disclosed for example in the document "Blockchain Economics" by Joseph Abadi and Markus Brunnermeier).

Apart from the aforementioned trilemma, security and scalability are also concerning in the design and implementation of DLT technologies. In robust and secure public blockchain networks like Bitcoin, scalability and performance are the challenges that are now coming to the fore. On the other hand, private networks like Hyperledger Fabric are more scalable but are not tolerant to Byzantine faults. Now, there are projects exploring solutions to improve the performance in public blockchain networks; all of them are based on the concept of interoperability between DLT technologies, as for example:

State channels: It is a protocol that operates on top of a public Blockchain, it increases the performance in the transactions using bidirectional channels. These transactions do not require block confirmations and are atomic. In other words, a pull of transactions is made off chain and then, a resume of the results are stored in the main chain. However, this mechanism requires all user to watch constantly for fraud. One implementation of this concept is the Lightning Network used in Bitcoin.

Sidechains: A side chain is an independent chain used to improve the features of the mainchain and also to not overload it. One implementation of this type of improvement is Plasma, a project developed in the Ethereum ecosystem, where there is an unlimited number of child chains. The structure of Plasma is made up using smart contracts and Merkle trees that enables to create child chains that have copies of the main chain of Ethereum. This project has not been released yet.

Both solutions, regarding to operability, are capable of creating services in different DLT technologies. However, to discover them is not trivial. There are some related works whose proposal is the creation of a discovering service of the deployed applications in decentralized architectures. With this aim, there are works trying to create a decentralized service registry that enables the discovery of services deployed in a private blockchain and the secure verification of the integrity of the data stored. This mechanism consists of two smart contracts that allows the registry of services and users. By this way, it's possible to know the services deployed and its origin, due to the relation between a trusted registered user and its service.

On the other hand, the operability in the management of the identities between networks is a problem that has not been solved yet. The identities managed in the case of the use of the sidechain are not interoperable between them; due to this, users have as many identities as networks that they're interacting with. In this line, there are several projects whose objective is to create a decentralized identity, usually represented using the decentralized identity standard developed by World Wide Web Consortium, W3C.

The implementation of the storage in the majority of DLT networks is built up using Merkle trees (generally speaking, a Merkle tree is a hash tree in which its leaf nodes are hashes of data). Using them the storage of the data is secure and complete but in some cases the verification of the information is inefficient. For this reason, to improve the verification of the data there are some implementations based in Merkle tree as for example:

Sparse Merkle Multiproofs. A multiproof is a group of proofs of the same Merkle tree wrapped up together. With this method is possible to rebuild the Merkle root using only these proofs. Due to this, in the verification there is no need to build the entire tree. In this way it's possible to saving storage and calculation (see for example the document "Revocation Transparency" by Ben Laurie et al.).

Merkle pollards. A Merkle pollard is defined the whole of a Merkle root and a determined number of levels of intermediate branches. They are used to improve the verification in cases where there are many repeated proofs against the same Merkle tree.

In any case in the existing DLT solutions, the first blockchain trilemma previously mentioned (regarding the correctness, decentralization and cost efficiency features) has not been solved yet. Ideally there could be a mechanism to provide these three characteristics in a DLT ecosystem, but a solution has not been found yet or implemented in a single decentralized ledger.

It is already known in the DLT ecosystem that networks only achieve two of these three main characteristics: scalability, decentralization, and security. Public blockchain networks are decentralized and very secure, but not scalable. On the opposite, private blockchain networks are scalable and depending on the implementation can be either more decentralized or more secure. For this reason, private blockchain networks are less trusted than public ones. Furthermore, in blockchain networks with a minimal number of nodes are prone to suffer attacks and henceforth the integrity of the data could be compromised. It has also been proven that blockchain networks with few nodes are more scalable than big ones. Consequently, in enterprise environments, where the high throughput of the network is a requirement, it's necessary to implement this type of architectures decreasing the trust in the integrity of the data.

To solve this problem, a widely applied solution has been the use of hybrid blockchain, where an application uses a private blockchain to improve its performance, storing validation information in a public sidechain to increase its security.

A sidechain is an independent blockchain used to enhance the performance of a particular blockchain. In this way, sidechains usually have very different characteristics from the main chain. However, the relation is 1 to 1, one blockchain to one sidechain, or 1 to many and the technological nature of the implementation of the main chain and the side one is the same. If the code of the sidechain is compromised or disappears, the effort to maintain data integrity is in vain. Furthermore, if the sidechain is congested, this functionality would also be affected.

As previously mentioned, there are implementations that only fit to discover services in only one DLT network. In terms of the service discovery, and even in the discovery between networks that belongs to a DLT federated ecosystem, there are not mechanism and protocols to automate the discovering between the different neighbor networks. Also, for example in the case of the sidechain, if a user wants to use one of them, no mechanism exists to decide which network to use in case of congestion.

At present, each network manages the identities and discovery of the nodes that make it up using its own mechanisms. This fact makes inter DLT communication non-standard and is done independently in each case. Due to this, it is necessary the definition of a global naming protocol that will enable the discovery of the neighbor DTL networks.

Therefore, there is a need of an improved interoperability solution for DLT networks which overcomes the limitations of existing prior art solutions. The embodiments of the present inventions propose the implementation of a mechanism to build a federation of DLT networks that working in concert approach and solve current limitations of isolated and independent DLT network deployments.

SUMMARY OF THE INVENTION

The problems found in prior art techniques are generally solved or circumvented, and technical advantages are generally achieved, by the disclosed embodiments which provide a method and system to improve DLT networks.

The embodiments of the present invention provide an improvement in the characteristics (scalability, consensus, data consistency, level of trust . . . ) and generally speaking, in the performance/operation of DLT networks. More specifically, the present invention proposes a solution to build a federation of DLT networks used to provide enhanced trust in isolated networks. A goal of the invention is to ensure data integrity within a network belonging to the federation of interconnected DLT networks, regardless of the underlying technology that implements the network systems. This way, it will be possible to ensure the scalability and the data integrity between networks and thus create a more reliable DLT system.

The rationale behind the present invention is building a federation of networks to enable all of the belonging systems to leverage the level of trust and immutable storage of other networks. Thus, DLT applications are deployed over this system are abstracted of the underlaying DLT platforms and protect the integrity of the data stored in their networks regardless of their nature.

The proposed solution enables the creation of scalable DLT networks that guarantee the integrity of the data, giving a greater security compared to other types of existing networks. Furthermore, instead of using an only side chain that which makes it dependent on its existence and on its load, it is possible to spread the data in multiple chains, so it will be replicate, and thus more secure and complete. Also, the performance will not be compromised due to a congestion management mechanism where the data may only will be spread in a neighbor network if this network has a low traffic.

In a first aspect, it is proposed a computer implemented method for enhancing the performance of at least one Distributed Ledger Technology, DLT, network of a group of independent DLT networks (each network comprising one or more electronic computing nodes) connected by one or more communications networks, the method comprising the following steps performed by a computing node of at least one of the DLT networks of the group, called first DLT network:
  a) Transmitting a generated control block to (one or more computing nodes of) N other DLT networks of the group, N>=1, (for example, to all the rest of DLT networks of the group), where each control block at least contains Proof of History information of the computing node of the first DLT network (to validate the data integrity of the first network in a specific timestamp); and going to step b);
  b) Receiving, through the one or more communications networks, confirmation messages from (computing nodes of) one or more other DLT networks of the group, where (a computing node of) another DLT network transmits the confirmation message after having received the control block, validated it and added it to a distributed ledger (for example, a blockchain or any other type of distributed ledger);
  c) After Tc transactions of the computing node of the first DLT network, determining whether confirmation messages has been received from at least Kc different DLT networks of the group, where Tc and Kc is a design parameters of the first DLT network and, if so, generating a new control block, and going to step a) for transmission of the newly generated control block.

Tc and Kc may be selected according to a level of trust required in the first DLT network and/or according to the number of malicious nodes expected in the group of DLT networks.

The method may further comprise:
every Tl transactions of the computing node of the first DLT network, where Tl is a design parameter of the first DLT network, transmitting a message to other DLT networks of the group requesting one (or more) previously transmitted control blocks, where said message is transmitted to computing nodes of the DLT networks from which a confirmation message has been previously received for said previously transmitted control block;
if during a certain period of time, successful reply messages to the request are received from less than Kc different DLT networks, retransmitting said previously transmitted control block to one or more computing nodes of N other DLT networks of the group.

Tc, Kc and Tl may be selected according to a level of trust required in the first DLT network and/or according to the number of malicious nodes expected in the group of DLT networks. Specifically, Tc, Kc and Tl may be selected according to a value of Detection Trust Index, DTI, required in the first DLT network. In an embodiment, the Detection Trust Index is defined as:

$$DTI = 1 - \left[ \sum_{i=0}^{Kc-1} \frac{\left(\frac{p}{q}\right)^i * e^{-\left(\frac{p}{q}\right)}}{i!} + \frac{Tl}{Kl} * \alpha_{loss} * \sum_{i=0}^{Kl-1} \frac{\left(\frac{p}{q}\right)^i * e^{-\left(\frac{p}{q}\right)}}{i!} \right]$$

where Kl is the number of previous control blocks requested to the other DLT networks and p/q is the ratio between honest computing nodes and malicious computing nodes.

The group of networks may be a federation of DLT networks.

The transmission of control blocks may be implemented in a transport layer of the computing node of the first network.

In an embodiment if, in step c) it is determined that confirmation messages have been received from less than Kc different DLT networks of the group, no new control block is generated and going to step a) for transmission of the previously generated control block. Also optionally, if, in step c) it is determined that confirmation messages have been received from less than Kc different DLT networks of the group, reducing the value of Kc and going to step a).

In order to generate the Proof of History information, a Sparse Merkle multiproofs technique may be used. And the Proof of History may be built at least taking into account the transactions generated in the first DLT network computing node since the previous control block (the immediately previous control block, that is, the preceding block) was transmitted. Optionally, the Proof of History is built taking also into account the content of the previous control block.

In an embodiment, a control block also contains at least one of the following contents: Identification of the computing node in the first network that has generated the control block; the total number of blocks in the first network until the generation of the control block; the total number of control blocks already generated by said first DLT network; ID of the previous control block.

In an embodiment, the first DLT network stores the confirmation messages received. The confirmation messages may include one or more of the following: an address of the computing node receiving the control block, the type of DLT network which has received the control block, a timestamp of the confirmation message and a signature of the sender of the confirmation message.

In an embodiment, the value of Kl is preferably in the range [1,3], for example, Kl=2. Additionally, the value of Kc may be preferably in the range [2,5] and/or the value of Tc may be 2 (these are only non-limitative examples, and other values are possible).

The steps of the methods may be performed by computing nodes of more than one network in the group of networks (that is, the method can be applied not only for a single network but for several or all the networks of the group).

In a second aspect, systems are proposed to carry out the above disclosed methods. For example, it is proposed a system for enhancing the performance of Distributed Ledger Technology, DLT networks, the system comprising a group of independent DLT networks connected by one or more communications networks, where at least one computing node of at least one of the DLT networks of the group, first DLT network, comprises a processor configured to:
Transmit a generated control block to one or more computing nodes of N other DLT networks of the group, N>=1, every Tc transactions of the first network computing node, where Tc is a design parameter;
where a newly generated control block is transmitted only if it is the first control block transmitted or if it is determined that the previous control block has been validly transmitted;
and where each control block at least contains Proof of History information of the first network computing node;
Receive, through the one or more communications networks, confirmation messages from computing nodes of one or more other DLT networks, where a computing node of other DLT networks transmits the confirmation message after having received the control block, validated it and added it to a distributed ledger (for example, a blockchain or any other type of distributed ledger), for example an internal distributed ledger;
where it is determined that a previous control block has been validly transmitted if confirmation messages has been received from at least Kc different DLT networks of the group, where Kc is a design parameter of the first DLT network.

A last aspect of the invention refers to a computer program product comprising computer program code adapted to perform the method of the invention, when said program code is executed on a computer, a digital signal processor, a field-programmable gate array, an application-specific integrated circuit, a micro-processor, a micro-controller, or any other form of programmable hardware. A non-transitory digital data storage medium is also provided for storing a computer program which comprises instructions causing a computer executing the program to perform the above-described method.

Consequently, according to the invention, a method, system and storage medium according to the independent claims are provided. Favourable embodiments are defined in the dependent claims.

These and other aspects and advantages of the invention will be apparent from and elucidated with reference to the embodiments described hereinafter.

BRIEF DESCRIPTION OF THE SEVERAL VIEWS OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DESCRIPTION OF SPECIFIC EMBODIMENTS OF THE INVENTION

The present invention may be embodied in other specific system and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The embodiments of the present invention propose an architecture for a federation of DLT networks to work together regardless of the underlying technologies to guarantee data consistency, wider consensus and enhanced trust, enhancing therefore the DLT networks performance. The proposed protocol may include among others, a scheme for the naming and discovery of every resource in the federation of networks (identities, applications, networks, blocks, etc.); a distributed transport mechanism for the exchange of control data between the different networks of the federation; and the spread and storage of "proofs of history" of the network to protect and validate the connected networks integrity. To broadcast networks' proofs of history used to validate their data integrity, a mechanism based in control blocks is devised. This control block is spread periodically throughout the federation of networks, and it ensures that the information of a network has not been modified and the data is still complete, without revealing any information of the network. This protocol may include schemes to ensure the liveliness of control blocks and congestion prevention.

Each DLT network comprises one or more (usually many of them) nodes (computing nodes); the computing nodes are electronic devices of any type (for example, servers) including databases storage capacity (memory) and processing capacity (processor).

Figure 1:
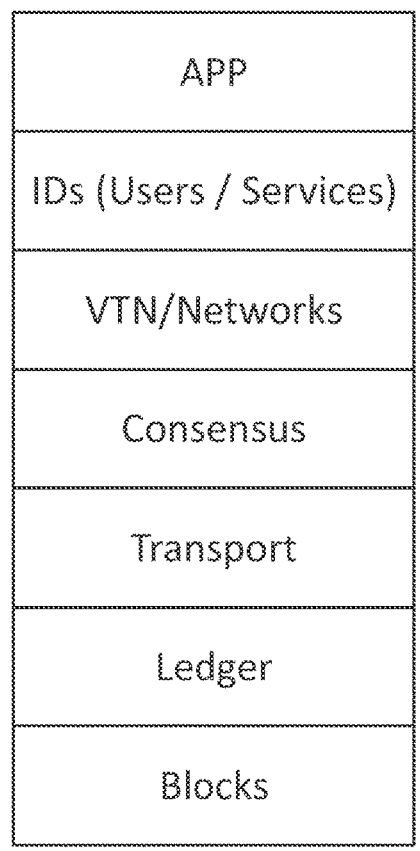
FIG. 1 shows a schematic diagram of the stack of protocols proposed according to one embodiment in the present invention.

Every network in the federation may implement a stack with the following layers (protocols), as shown in FIG. 1. In other words, each network (actually each node of the network) implements the following functional layers to perform the different required tasks. (This is only a non-limitative example and some of the layers may be optional, that is, not all the layers are mandatory for the implementation of the present invention):

Application layer: It includes all the services and smart contracts deployed over a specific network.

Identity Layer: Layer to manage all the identities of the components in the federation of networks, such as users, deployed services, blocks, individual networks, nodes, etc. This scheme enables the representation of any component of the DLT (e.g. blockchain) networks. For example, for the identification of mentioned components mentioned, it may be used the standard of decentralized identifiers (DIDs) created by the W3C community. In this case, taking into account the different types of components (resources) mentioned above, the identifiers may be implemented in the following form: did:vtn:<networkid>:<resource type>:<resourceid>;

where: "Network ID" represents uniquely the DLT network; "Resource type" represents the resource as for example service (to represent applications), user, node, block, etc.; and "Resource id" is a unique identifier of the resource.

This is only an example and any other identification technique may be used.

Virtual Trust Network (VTN) Layer: It offers a layer of aggregation to all the networks in the federation. The aggregation is ensured, for example, through the Discovery Naming Service protocol which allows to uniquely access any resource (component) in the federation of networks through a single endpoint.

Consensus Layer: It manages the implementation of the data integrity of networks in the federation. As it will be explained later, every network that wants to participate from this trust-enhancing protocol will have to deploy a process (usually a daemon process) to manage the exchange of control data and control blocks.

Transport layer: It defines the different interfaces and communication protocols to be able to connect the independent networks of the federation.

Ledger and blocks define the storage layer (for example, in a blockchain). These layers will be characteristic, specific and independent for each network.

Now, the consensus layer (which is the most significant layer of the proposed architecture) will be more detailed explained.

In a DLT federated network ecosystem (where the present invention can be applied), the objective of the consensus layer is to be able to guarantee the integrity of the data of another federated DLT (for example, blockchain) network (for example, in the event that it does not have a sufficient number of nodes to be able to provide a sufficient level of trust, or in case that part of its ledger is altered or lost).

Figure 2:
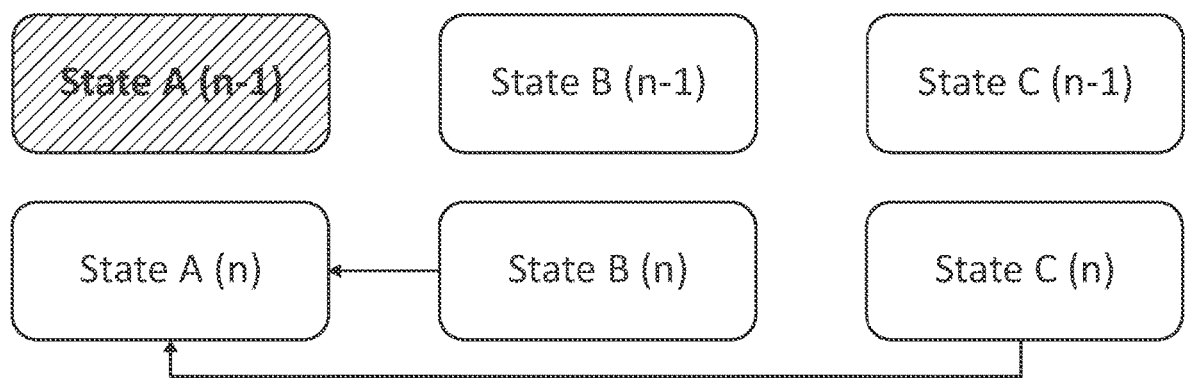
FIG. 2 shows a schematic block diagram illustrating a possible scenario where a DLT network (A) has been compromised.

Without loss of generality, let's consider three different DLT networks (also called DLT platforms, for example, blockchain platforms), A, B, C, with their different states of the ledger in their own timeline (time n, time n−1) as showed in FIG. 2. If the state of the network A or some of its nodes have been compromised (stripped in FIG. 2), the networks B and C should be able to guarantee that the state of A is still consistent in base of their states of the world. All this without revealing any information that has been stored in the network A.

For this reason, and in order to achieve this objective of guaranteeing integrity, according to embodiments of the present invention, each DLT network of the federation must issue a control block every certain time, which will be stored in the rest of the federated networks.

Every federated network can choose the period to generate the control block. It can be, for example, a certain pre-established number of transactions (transactions period) and/or it can be a certain time (time period) that has elapsed since the last control block was generated. That is, as a non-limitative example, a control block can be generated every 4 milliseconds and/or every three transactions.

Here, it is considered a transaction in a DLT network, for example, an operation used to trigger changes in a DLT network. Generally speaking, the interaction with DLT networks is performed through transactions that trigger changes in the ledger or functions in a smart contract.

This parameter (the time or the number of transactions every which a new control block is generated) would be called "pulse" and each federated network will have its own pulse. Furthermore, preferably the parameter should be private and not shared with any federated network. In this way, it is not possible to calculate in a deterministic way what interactions and activities are occurring in the different networks.

Figure 3:
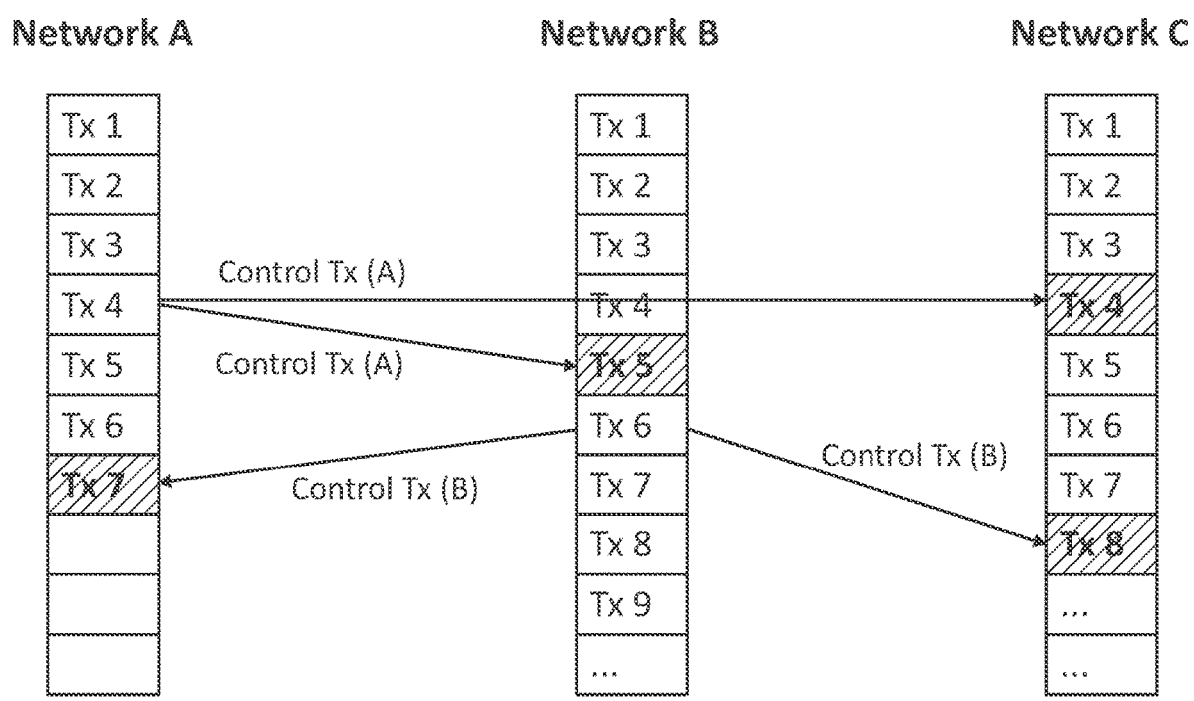
FIG. 3 shows a schematic diagram of the control block exchange according to one embodiment in the present invention.

In the example depicted in FIG. 3, network A will generate a control block represented in a transaction, every four transactions (transaction period A=4). This information will be spread to the neighbor networks (B y C) and will be stored in their ledger. In the same way, network B will generate its control block every six transactions transaction period A=6) and will be stored in the ledger of the neighbor networks (A y C). As shown in the example of FIG. 3, the transmission or reception of control blocks may be considered transactions also used in each network in counting their pulse.

For redundancy, the control block is sent by a network to all the rest federated networks or to some of them (generally speaking it will be sent to N networks, N>=1 where N is a design parameter); however, it must be ensured that it has been stored in a minimum of them. By each network, chaining the blocks in the different ledgers, the integrity of the control blocks is given much more security, due to the blockchain characteristics.

The control block may have different contents. In an embodiment said control block will contain at least one (preferably all) of the following contents: an identification of the node and the source network (the network that has generated the control block); information about the total number of blocks in the source network until the generation of the control block, the number of control blocks already generated, the ID of the previous control block sent, proof of history to validate the data integrity of the source network in a specific moment (specific time stamp).

Using the standard defined in the identity layer, a control block may be represented as follows:
did:vtn:<networkid>:blockc:<hash>{
   Origin
   Number of blocks
   Number of control block
   ID of previous control block
   Proof of history
}
where
   Origin will be the node in a determined source network that has generated the control block.
   Number of blocks, represents the total number of blocks in the source network.
   Number of control block, the total number of control blocks generated.
   ID of the previous control block, for example, represented with the DID nomenclature previously mentioned.
   Proof of history implements the required information to validate the data integrity of the source network in a specific timestamp (this determined moment).

The generation of the proof of history is be critical in ensuring the integrity of data on a network and therefore ensuring its trust level.

In an embodiment sparse Merkle multiproofs is going to be used. That is, in this embodiment, as a base implementation for the proof of origin scheme, the use of the state-of-the-art sparse Merkle multiproof mechanism is proposed (this is only an example, and others proof generation techniques can be used). A multiproof is a group of proofs against the Merkle tree; all the proofs are encapsulated and send together, and it is possible to recalculate the root of the Merkle tree using these proofs.

In this case, to generate the Merkle tree it's necessary to use the transactions generated in a pulse (that is, the transactions generated since the last control block was generated). Also, with the goal of not revealing any content of the transactions generated in the pulse and to ensure consistency with the history of control blocks, in an embodiment it is added to the Merkle tree the root of the previous tree, that is, the root of the tree generated for the previous control block.

Figure 4:
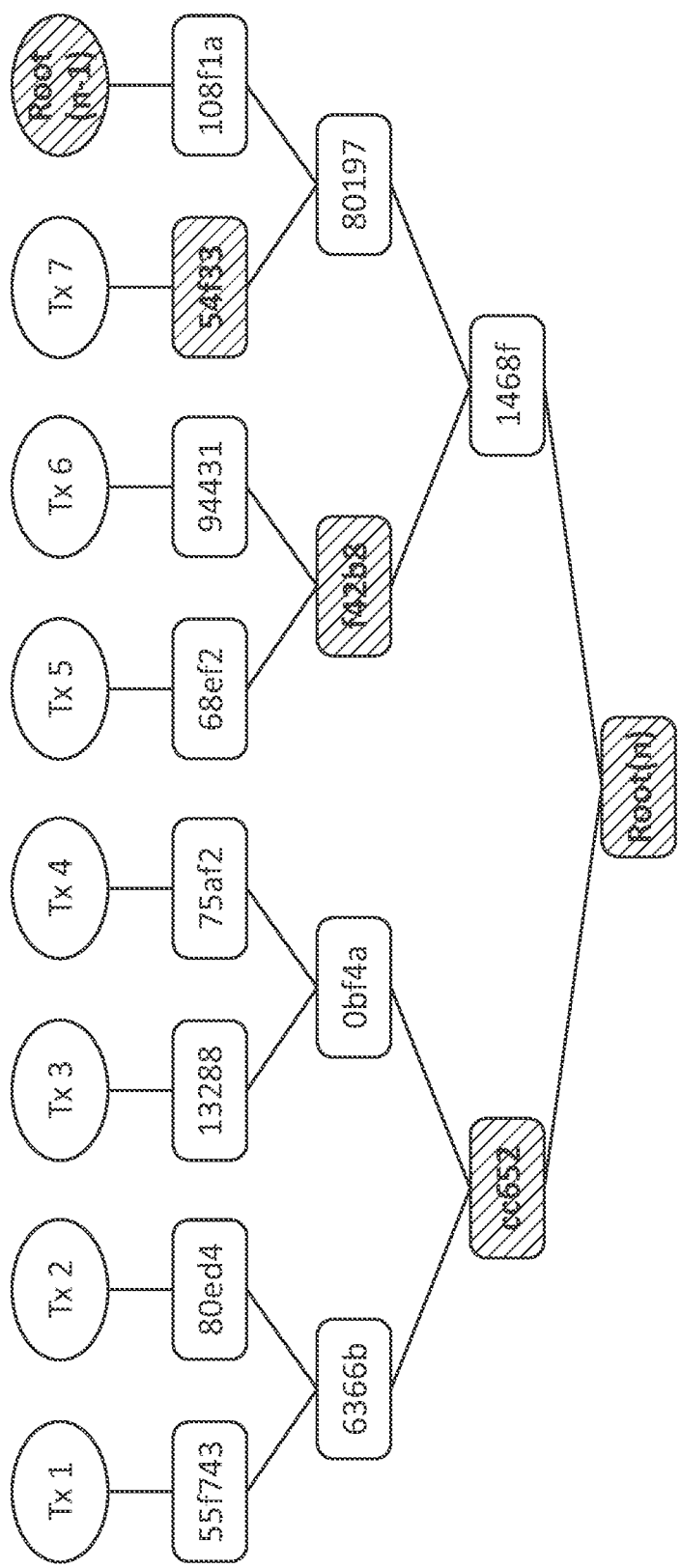
FIG. 4 shows a schematic diagram of the Merkel tree used to generate the proof of history according to one embodiment in the present invention.

The root of the Merkle tree will be stored in the ledger of the network that wants to ensure its integrity (the network generating the control block). To generate the multiproofs, the root of the previous tree will be shared as leaves of the tree and some hashes of the different levels of the tree. This is illustrated in FIG. 4.

Some of the nodes (leaves/root) of the built Merkle tree will be send as the multiproofs inside control blocks. In the example, shown in FIG. 4, the marked leaves of the tree are going to be the multiproofs that will be send as proof of history inside control blocks. This is only an example, and any other number of leaves or any other leaves of the tree can be included in the multiproofs sent. If the network that is sending the proof wants to verify its own history, it will have to recollect all the multiproofs, to rebuild de Merkle root and to check that the Merkle root it's the same. If the root is equal, the history will be complete, if not, the history in the ledger has been modified.

In the above example, sparse Merkle trees are used in the proof of origin scheme for the validation of data; however this is only an example, and in other embodiments, other cryptographic techniques could be used to offer integrity over the data in the source, as, for example, ZKProof, simpler hash constructions, authentication primitives or any other cryptographic structures.

The mechanism to spread the information (the control blocks) will be implemented in the transport layer of the stack mentioned above.

The exchange of control blocks will be implemented by a process (usually a daemon process or service) inside a network node. It will not be necessary for the daemon to be implemented through a smart contract, with all the scalability problems that this involves.

As mentioned above, the peers (usually all peers) generate control blocks, the (daemon) service may be able to collect all of these blocks, even if they are repeated. In this way, a basic level of tolerance is achieved in the event of Byzantine failures in the generation of the control block (as it will be explained later).

Figure 5:
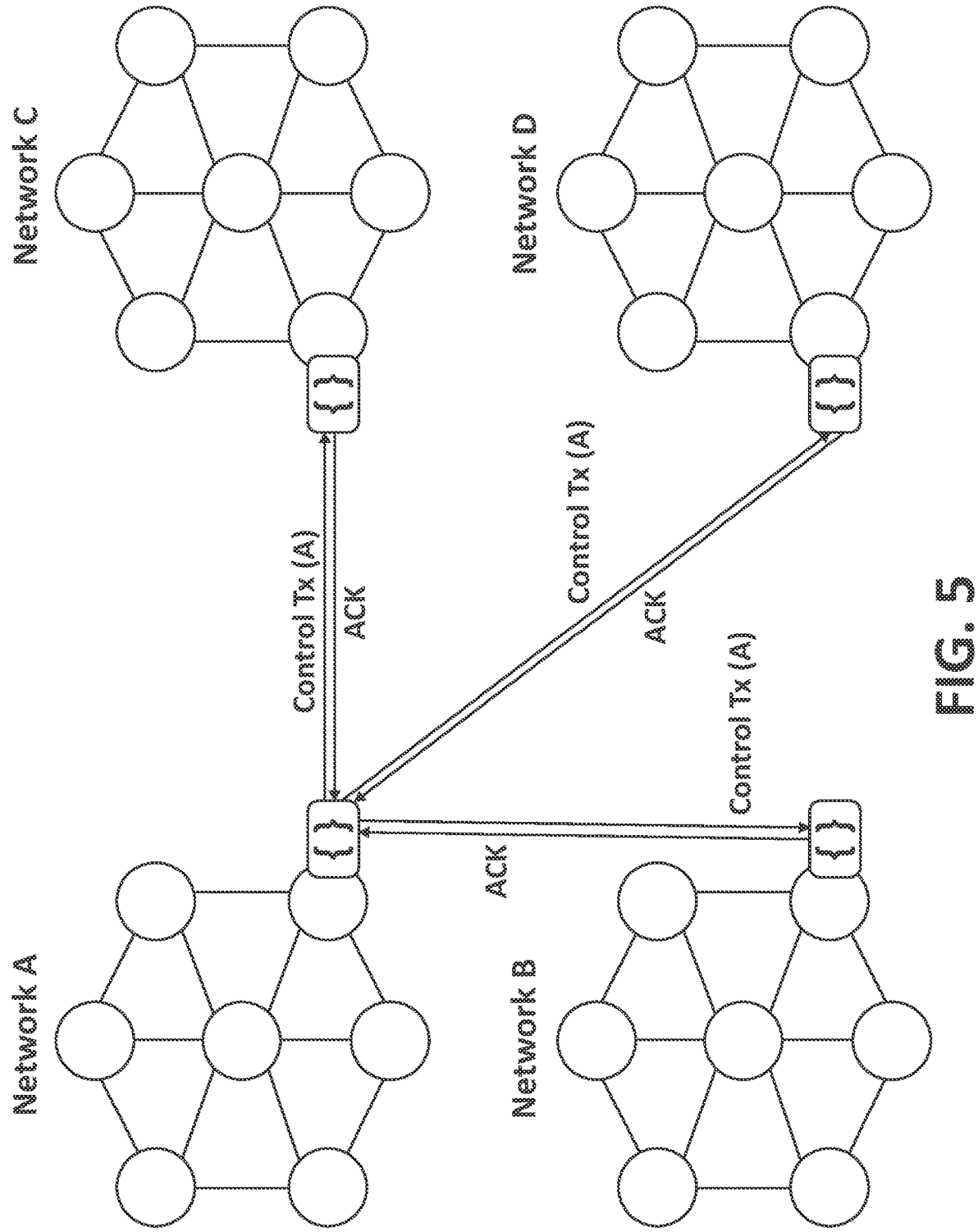
FIG. 5 shows a schematic diagram of the control block exchange between the network nodes according to one embodiment in the present invention.

On the other hand, all the networks (networks nodes) that receive control blocks must send a confirmation message (ACK) to the source network (see FIG. 5). This network stores these confirmations (for example, in a distributed hash table DHT) in order to monitor the blocks disseminated in the neighbor networks for further validation.

With the proposed method, even if all but one of the nodes of the network are down, the surviving node, will be able to guarantee that the network's history has not been altered. For this, the (daemon) service of the node will request to the neighbor networks the verification of the control block (in the above explained example, the sparse Merkle multiproof).

The scalability of the network could be affected if the number of control blocks it has to store is too high (it could damage the internal processes of the network). For this reason, the daemon must monitor the state of its own network to determine to what extent it can accept control blocks from other networks. Thus, if a network doesn't receive enough ACKs for its transmitted control blocks, it can infer that peer networks in the federation may be quite congested, and it may need to reduce its control block generation rate (e.g. Tc) until peer networks are ready to accept every control block.

The exchange of control information between nodes of different networks may be performed using a common p2p transport layer. Blockchain and DLT networks are built over p2p transport protocols (for example, libp2p family protocols of any other transport protocol) responsible for the discovery of nodes, the routing of messages throughout the whole network, the discovery of data stored in the network, the publishing and subscription of messages, and the exchange of control messages for the orchestration of the network. In an embodiment, the present invention scheme is built over a common p2p transport protocol layer enabling the discovery of nodes of different DLT networks and the broadcast of control messages and control blocks with every node participating from the system. These protocols may be implemented over the transport layer of existing protocols such as TCP/UDP and IP. The communication between networks A and network B (to transmit/receive control blocks) is made through one or more (tele)communications networks using any known communication technology (wireless or wired communications technology, mobile communications of any type as for example, 2G, 3G, 4G, 5G or any other communications technology).

As previously mentioned, the scheme for generation of control blocks in every network is orchestrated using a process (usually a daemon process) which is usually implemented over a common (P2P) transport protocol layer. In an embodiment, in this control blocks generation scheme the following concepts/tasks may be distinguished (this is only an exemplary embodiments, and not all are mandatory for the implementation of the present invention):

Detection Trust Index: Each network will require a different level of trust and integrity of its data according to the specifics of the network and its hosted use cases. In order for networks to adapt the operation of the control block protocol to their desired level of trust, the concept of "detection level trust index" is introduced. This parameter it is an objective metric to measure the level of trust according to the specific configuration of the proposed protocols; specifically, it is a measure of probability of loss of the data integrity in a network.

Control blocks broadcasting: It specifies the scheme of control blocks broadcasting and exchange of control blocks with other networks of the federation.

Control blocks liveliness: It is a mechanism (usually an algorithm) used to determine and ensure that other networks are still storing the control block data required to perform a future validation in a protected network.

Congestion control: This mechanism is included to avoid congestion in the connection link between networks and in the destination networks by preventing control block issuers (source network) from indiscriminately broadcasting control blocks, hence avoiding potential DDoS (Distributed Denial of Service) and reducing as possible the bandwidth protocol of the control block scheme. This congestion control is optional for the operation of the overall system, and its implementation may be based on the resolution of a simple Proof of Work problem in order to be entitled to broadcast a control block. Thus, in order for a node to send a control block, it will have to find the nonce that ensures the hash of the full control block (in an embodiment, this algorithm s inspired in Ethereum's Whisper messaging congestion control system). The difficulty of this Proof of work problem is proportional to the status of the connection links between networks (or rather between the electric devices of the networks) and of the rate of generation of control blocks of the source network:

$$\text{CongestionDifficulty} = \left(\frac{1}{Avg_{T_c}}\right) * (Avg_{RTT} + Avg_{Validation}) = \left(\frac{1}{Avg_{T_c}}\right) * (Avg_{ACK})$$

Where $Avg_{T_C}$ is the average rate of generation of control blocks, $Avg_{RTT}$ the average Round Trip Time of packages in the broadcast of messages and $Avg_{Validation}$ the average validation time required to insert the control block into a ledger of a counterpart (reception) network. The sum $(Avg_{RTT}+Avg_{Validation})$ can be simplified into $Avg_{ACK}$ which the average time spent from the broadcast of a control block to the reception of the ACK from the reception network.

When a network node broadcasts a control block, it waits for a minimum number of ACKs (Kc) from different networks to consider valid the broadcast of the control block. This minimum number of ACKs required (Kc) may be chosen by the node according to its desired Trust Detection Index (as it will be later explained about this below). Control blocks are generated every Tc transactions (Transaction period=Tc). This period is a design parameter determined by each network.

In an embodiment, if less than Kc ACKs are received, the same control block is retransmitted until enough ACKs are received. If after several retransmissions, Kc ACKs are not received (for example, due to a congestion situation), the value of Kc may be reduced. In a possible implementation, Kc is considered as an optimal value and a minimum threshold, such as Kc=(1, 3). For example, the default Kc would be 3, but if there is congestion in the network and after several retransmissions 3 valid ACKs are not received, the system would settle with at least 1 ACK (this is only a non-limitative example and any other values of Kc can be chosen).

Every network node may keep a local storage locally to account for the ACKs received from other networks, and in order to keep track of the control blocks shared for future validations. Thus, for every control block a node keeps a key-value structure containing the content and ID of the control blocks transmitted and the ACKS received from other networks for each control block. This is shown in an example in the following table:

| # Control Block <hash> | | Value |
|---|---|---|
| $CB_1$<55rf1ek> | $CB_1$ Content | $ACK_1, ACK_2, ACK_3, ACK_n$ |
| $CB_2$<29e1oe> | $CB_2$ Content | $ACK_1, ACK_2, ACK_3, ACK_n$ |
| $CB_3$< 9m2iyo> | $CB_3$ Content | $ACK_1, ACK_2, ACK_3, ACK_n$ |
| $CB_4$<10d23d> | $CB_4$ Content | $ACK_1, ACK_2, ACK_3, ACK_n$ |

In an embodiment, every control block is identified through its hash (as shown in the table above). This id represents the key of this local key-value store. The value for each key is block ci hash, where block ci hash is the hash of the control block (its unique identifier). On the other hand, in the value it's necessary to store the control block that has been issued and a list of ACKs received from other networks that has received said control block. These ACKs may have the following form: {origin_address, type, timestamp, origin signature}, origin address is the source address (or resource uri if the discovery service is used) where the control block can be retrieved in the future (e.g. the address of the computing node storing the control block in the DLT network which has received the control block), the type determines the type of DLT platform from the source network generating the ACK, timestamp may include information about the specific moment of time this ACK was generated and, alternatively or additionally, the network receiving the ACK also timestamps in its registry the specific moment when the ACK was received from the neighbour network (this will be used for the liveliness algorithm); and finally the signature authenticates the sender of the ACK.

Each network node stores this key-value structure including information about the control blocks said network node has transmitted (that is, this key-value structure is a network node level element and it is not necessary to replicate said information in the rest of nodes of the network). This can be stored in a node as a plain storage, or it can use cryptographic constructions such as a DHT or a Merkle DAG (Directed Acyclic Graph), or an index-based storage to ease the future search and validation of data. This occurs in the case of the nodes of the network that is issuing (generating and transmitting) the control blocks. However, in the case of the nodes which receives the control blocks from another network, the control block is stored in their distributed ledgers (for example, blockchains). That is, each node of a federated network stores the control blocks received from other networks in a distributed ledger/blockchain (which is usually replicated in all rest of nodes of the networks).

The control blocks can be sent from a single node of the source network (A) to the rest of networks (B, C) or from several nodes of a network (A) to the rest of networks. Usually the control block is broadcasted to all the networks of the federation. In an embodiment this is done through their shared networking layer; so the source network (A) will not choose specific networks to send its control block, but it would broadcast the block and wait for ACKs from others (it is similar to a publish-subscriber approach, where A publishes the control block to the network and waits for subscribers to answer).

It should be noted that in case two or more nodes in the same DLT network broadcast control blocks, in an embodiment the blocks broadcasted by each of the nodes are identical. Thus, whenever two control blocks with the same content submitted by two different nodes in a same DLT network reach another DLT network they do not need to be duplicated in this DLT but can be written just once.

To this block broadcasting scheme, a liveliness algorithm is attached to ensure that a minimum number of the control blocks broadcasted are still "alive" in other networks, or otherwise some of them have been lost, for instance if any of those networks is down or has been hacked. For this purpose, every certain number (Tl) transactions (liveliness period also chosen by the corresponding network node) at least the oldest control block is chosen and requested by a source network to the networks from which ACKs where received when sending said control block the first time. This process can be done by one or more nodes of the source network and by one or more nodes of the rest of networks (which received the control blocks).

If the requests are successfully answered by at least Kc networks nothing is done (that is, if nodes from at least Kc networks have stored in distributed ledgers, for example in blockchains, the control blocks and, consequently, successfully answer to the requests, then nothing is done). If the number of successful requests is less than Kc it means that the required Kc copies of that control block are not available. Hence, this control block (with the same content) is re-broadcasted until "alive" ACKs from nodes of at least Kc different networks are collected. This ensures that control blocks will always be available for future validations and error detections in at least Kc networks.

Thanks to the proposed embodiments, the maximum detection trust index (higher probability of no loss in the data integrity of a network) is offered so nodes of a DLT network can be surer that they can detect and recover from failures in their infrastructure. The higher the trust index, the higher the certainty that an error will be detected, and the data integrity kept. The trust detection may be defined as follows:

$$DetectionTrustIndex = [1 - Prob_{collusion} + Prob_{liveliness} + Prob_{blindspot})]$$

According to the above definition, the detection trust index considers the probability of collusion of networks when storing the broadcasted control blocks which also takes into account the redundancy in the broadcast of these blocks, the specifics of the liveliness algorithm, and the blind spot. The blind spot is the number of transactions not protected by a specific control block because they are in the middle of the most recent control block generation period and can be forged. That is, the transactions in a blind spot situation will be the transactions between the generation and transmission of consecutive control blocks, so the maximum number of transactions in a blind spot situation will be the transactions between the transmission of a control block in a certain time (n) $Cb_n$ and the transmission of the previous control block $Cb_{n-1}$, and it will be equal to the transaction period Tc as defined by the following equation:

$$\text{Blindspot} = Cb_n - Cb_{n-1} = Tc$$

In an embodiment, once a certain control block is transmitted (broadcasted) by a node of a first network, the reception of ACKs (from nodes of another DLT networks) for said certain control block is sealed after the next control block is received, in order to avoid a large space of potential collusions. Thus, new ACKs for a control_block ($Cb_n$), are only accepted until control_block ($Cb_{n+1}$) is generated (always considering that the minimum number of Kc of ACKs for the block were already accepted, if not the generation of the new control block is usually not allowed). Under this scenario, collusions (e.g. the transmission and storage of fake ACKs) can only be performed throughout the blind spot period. In the liveliness algorithm, if the redundancy decreases below the threshold of Kc, a new set of control blocks are sent to avoid loss of information. Thus, the blind spot probability ($\text{Prob}_{blindspot}$, also known as $\alpha_{blindspot}$), the probability of a control block with Number Txs Control Period (Tc) being forged after being sealed can be computed as:

$$\alpha_{blindspot} = \frac{\text{Number Txs Control Period}}{\text{Total control blocks} * \text{Number Txs control period}} = \frac{1}{\text{Total control blocks}} \to 0$$

The more total control blocks (with a number of transactions per control block) a network have shared (transmitted) and sealed already, the lower the probability of a block being forged outside the blindspot period, as malicious nodes would have to forge also previous control blocks already stored in other networks. So, this problem only appears at the beginning of a network joining the federation, and its probability quickly goes to zero when control blocks start being shared. Hence, the system can mainly be forged if a set of malicious nodes of different networks collude against a specific network, and a network alone is not able to forge the storage of a control block.

Considering this, the probability of collusion under a single ACK may be modelled according to the number of nodes in the federation using the following distribution:

$$x = \text{Prob}_{collusion\ single\ ACK} = \left\{1 \text{ if } p \leq q; \frac{q}{p} \text{ if } p > q\right\}$$

Where p is the probability of the network storing the control block being an honest network, and q the probability of it being a malicious network. The probability of a network being honest and malicious may be modelled as follows:

$$q = (\text{Avg}_{RTT} + \text{Avg}_{Validation}) * \text{malicious}_{nodes} = \text{Avg}_{ACK} * \text{malicious}_{nodes}$$

$$p = (\text{Avg}_{RTT} + \text{Avg}_{Validation}) * \text{honest}_{nodes} = \text{Avg}_{ACK} * \text{honest}_{nodes}$$

where $\text{Avg}_{RTT}$ is the average Round Trip Time of packages in the broadcast of messages and $\text{Avg}_{Validation}$ the average validation time required to insert the control block into a ledger of a counterpart (reception) network. The sum ($\text{Avg}_{RTT} + \text{Avg}_{Validation}$) can be simplified into $\text{Avg}_{ACK}$ which the average time spent from the broadcast of a control block to the reception of the ACK from the reception network.

Usually the $\text{Avg}_{ACK}$ is quite similar for malicious and honest nodes. So, considering $\text{Avg}_{ACK}$ similar to each other for the case that the node is a malicious node and the case that the node is an honest node, q and p could be simplified as the (normalized) number of malicious nodes and honest nodes in the whole federation of networks, respectively.

As previously explained, at least Kc honest ACKs (throughout the blindspot) from different networks are needed in order to the transmission of a control block be accepted as valid. Modelling this fact using a Poisson distribution (this is only an example, and any other statistic distributions can be used) the probability of receiving less than Kc honest ACKs throughout the blind spot can be modelled as:

$$\alpha_{collusion}(Kc) = Pr(X < Kc \text{ in } Tc) = \sum_{i=0}^{Kc-1} \frac{\lambda^i * e^{-\lambda}}{i!}$$

$$\text{where } \lambda = E[X] = \frac{p}{q}$$

$$\alpha_{collusion}(Kc) = \sum_{i=0}^{Kc-1} \frac{\left(\frac{p}{q}\right)^i * e^{-\left(\frac{p}{q}\right)}}{i!}$$

On the other hand, the liveliness fragment of the Trust Detection Index can be specified as the probability of loss of a stored control block in a network, plus the liveliness period between liveliness checks divided by the number of control blocks checked. If a control block has been lost, the source network must resend it to the other networks, for the control block to be stored again and an ACK is received for each storage of this block. This opens the door to a new interval of potential collusion that needs to be accounted in the liveliness probability:

$$\alpha_{liveliness} = \frac{\text{Liveliness}_{period}}{\text{Liveliness}_{checks}} * \text{Probability}_{loss} * \text{Probability}_{collusion}(Kl) =$$

$$\frac{Tl}{Kl} * \alpha_{loss} * \alpha_{collusion}(Kl) = \frac{Tl}{Kl} * \alpha_{loss} * \sum_{i=0}^{Kl-1} \frac{\left(\frac{p}{q}\right)^i * e^{-\left(\frac{p}{q}\right)}}{i!}$$

where Kl (Kl>=1) is the number of blocks checked in the liveliness algorithm (that is, the number of previously transmitted control blocks requested in the liveliness process); usually the Kl oldest control blocks (the Kl control blocks not checked for the longest time) are requested in the liveliness process; if Kl>1 the liveliness process is not performed individually but in batches of Kl blocks Tl is the period of liveliness checks (that is, in the liveliness process, Kl control blocks are checked every Tl transactions). And $\alpha_{loss}$ is the probability of loss of a stored control block in a network and $\alpha_{collusion}$ the probability of an ACK being corrupted in the destination network.

In the above formula and in some of the formulae presented in this text, the symbol α is used to refer to probabilities.

Consequently, considering the configuration metrics of the schemes previously presented, in an embodiment, the detection trust index (DTI) can be computed as (the blindspot probability has not been included because, as previously explained, said probability quickly goes to 0):

$$DTI = 1 - [\alpha_{collusion}(Kc) + \alpha_{liveness}] =$$

$$1 - \left[ \sum_{i=0}^{Kc-1} \frac{\left(\frac{p}{q}\right)^i * e^{-\left(\frac{p}{q}\right)}}{i!} + \frac{Tl}{Kl} * \alpha_{loss} * \sum_{i=0}^{Kl-1} \frac{\left(\frac{p}{q}\right)^i * e^{-\left(\frac{p}{q}\right)}}{i!} \right]$$

The blind spot probability is disregarded for the calculation of DTI, because it quickly goes to 0 as previously explained. This way, as it can be seen on the above formula, DTI does not depend on Tc.

This trust detection index uses to be specified by the source network according to the level of integrity it wants in its network. Thus, the different configuration parameters of the protocol stack (Kc, Kl, Tl) need to be fine-tuned to obtain the specific detection trust index desired for the network. Thus, considering different configuration parameters, it can be inferred the level of protection of the network and the required depth in control blocks to ensure the desired integrity of data.

Figure 6:
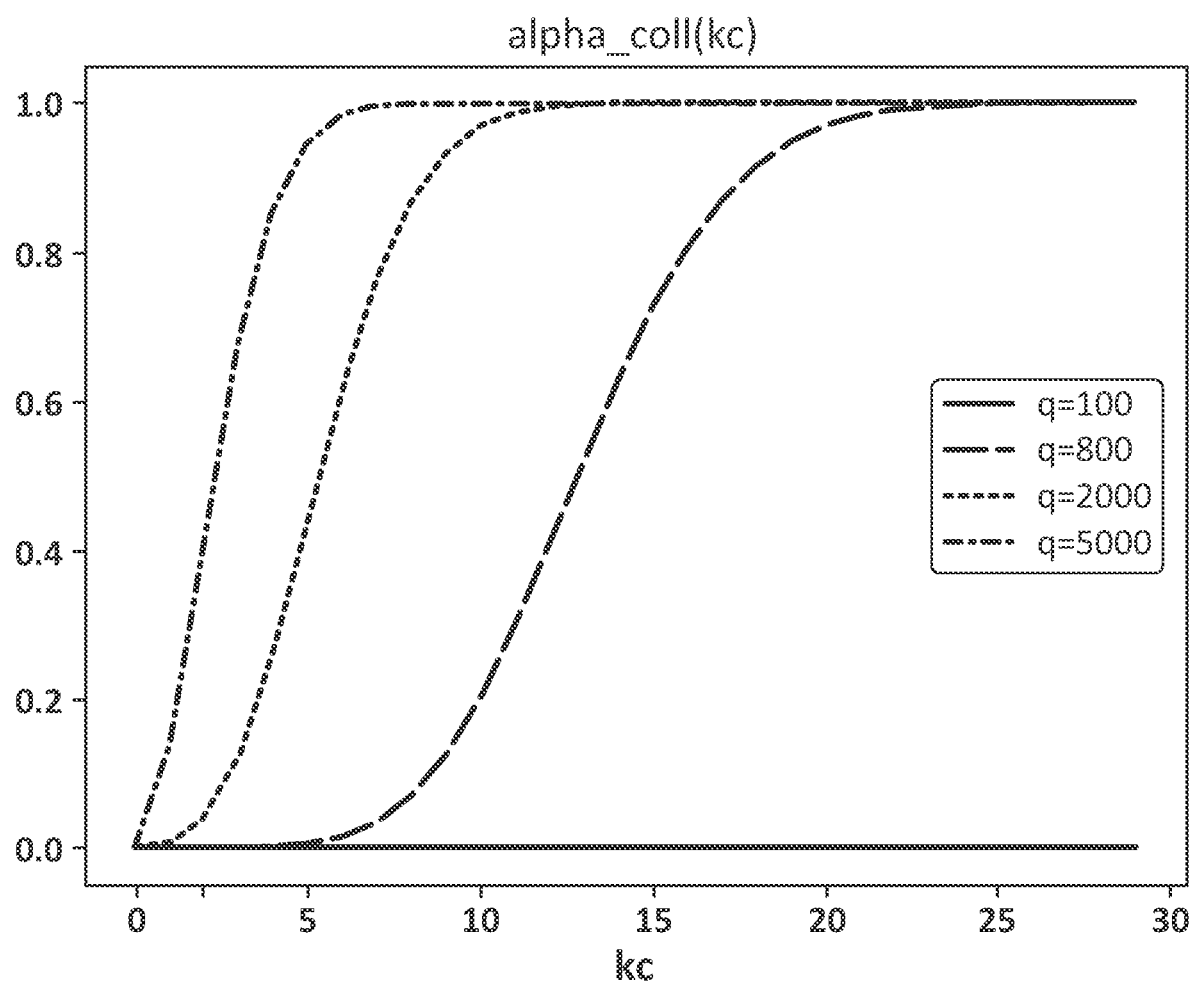
FIG. 6 is a graphic showing the Probability of Collusion depending on Kc for different values of malicious nodes according to one embodiment in the present invention.

For example, FIG. 6 shows a graphic considering how the values of Kc affect the probability of collusion for different values of malicious nodes (q) in the federation of networks (that is, in all the networks to which control blocks are broadcasted).

From this, the following conclusions can be inferred: (i) the higher the Kc, the higher the probability malicious nodes have to forge ACKs, as the source network waits for more ACK before sealing the control block; (ii) the number of expected malicious nodes in the network affects the maximum Kc that a node needs to select to avoid collusions (or to have a certain probability of collusion). For a small number of malicious nodes (100 in FIG. 6), the probability of collusion stays low independent of the value of Kc, so the level of redundancy of control blocks can be selected as desired; however, when the number of malicious nodes increases, the Kc has to be selected so that the system has enough redundancy but it doesn't open the door to a high probability of forgery of ACKs. Thus, for q (number of malicious nodes)=800 nodes, the maximum value to be selected of Kc should be approx. 5 under this scenario to avoid an explosion of the probability of collusion. This maximum value of Kc is approx. 2 if q=2000.

Figure 7:
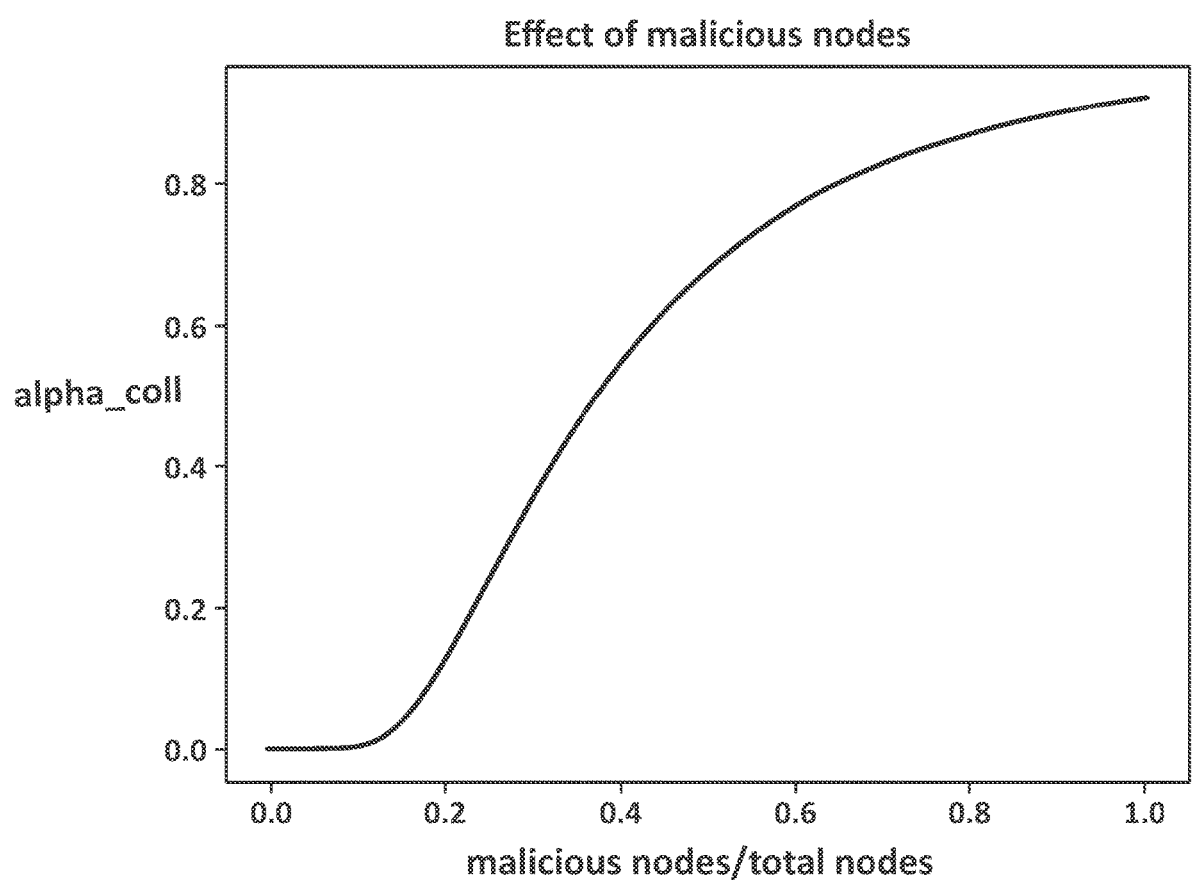
FIG. 7 is a graphic showing the effect of the ratio of malicious nodes in the Probability of Collusion for a certain value of Kc according to one embodiment in the present invention.

Now, the effect of malicious nodes compared to honest nodes (or to the total number of nodes) in the probability of collusion for fixed values of Kc will be considered (FIG. 7, which considers a fix value Kc=Tc=2). It can be seen that, as expected, the more malicious nodes there are in the network, the higher the probability of collusion. Nonetheless, adjusting Kc for the expected number of malicious nodes allows to minimize the effect of these nodes (as shown in previous figure).

In FIG. 7, it is shown the value of the Probability of Collusion depending on the ratio of malicious nodes/total nodes; for FIG. 7, it has been taking into account the number of expected malicious nodes not in a single network but in all the networks to which control blocks are broadcasted. It has to be pointed out that in FIG. 7 the value of the Probability of Collusion is low, even for a high ratio of malicious nodes, because of the chosen values of Kc and Tc for this case, Kc=Tc=2).

The control blocks stored in external networks may be lost due to outages, nodes storing the control blocks being disconnected, connection problems . . . ; the proposed liveness protocol aims to minimize this loss of control blocks. Thus, three main configuration metrics (parameters) that can be selected in this proposed scheme, Kc, Kl and Tl to control the integrity of the network (represented by the Detection Trust Index).

Tc is also a configuration metric (parameter) which can be selected; however, as previously explained, it does not affect directly the DTI. What Tc influences is the number of transactions a source network wants to include in its control block (as a control block is transmitted every Tc transactions); or in other words, Tc is the size of the batch of transactions protected in a control block This will differ between DLT networks in the federation according to the level of transaction protection each specific network is seeking.

Figure 8:
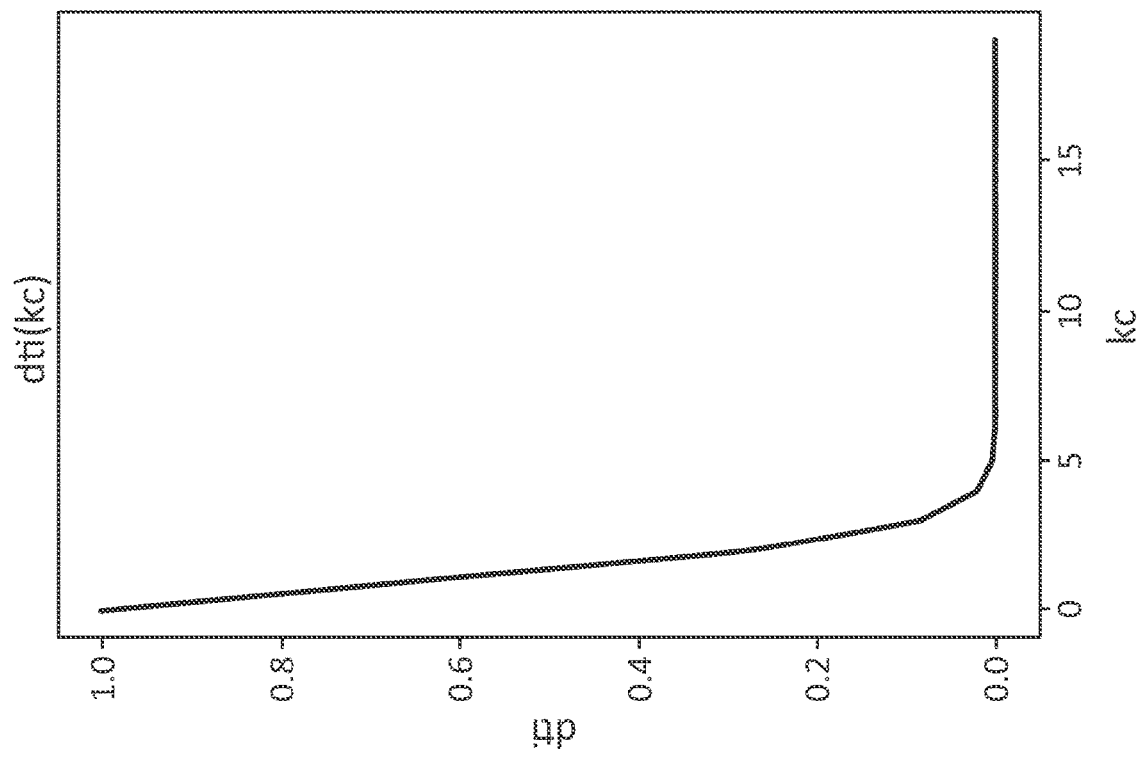
FIG. 8 are two graphics showing the Detection Trust Index for different values of Kl (left) Kc (right) for a specific number of malicious nodes, according to one embodiment in the present invention.
Figure 8:
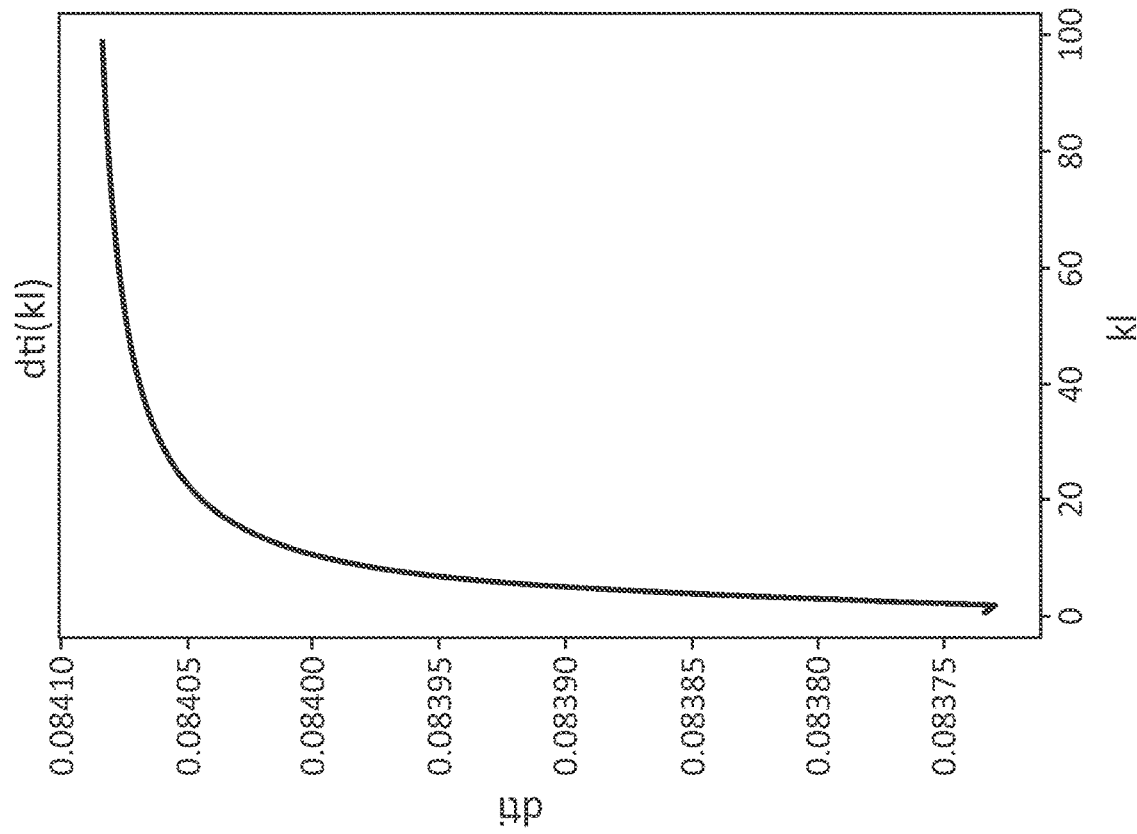

In FIG. 8, it is shown the behavior of the detection trust index for different values of Kc and Kl for a specific number of malicious nodes.

The detection trust index will give a value according to the specific metrics used and the conditions of the network. The higher this value, the larger the data integrity protection of the DLT network. So, thanks to the solution proposed in this patent application, taking into account the characteristics of the rest of networks of the federation, each network node can configure his control blocks process (choosing appropriated values of Kc, Kl and Tc) in order to achieve a level of integrity (trust) desired for the network (a certain DTI). In other words, the proposed solution allows that a network assures a certain level of trust only by applying the proposed control blocks mechanism, selecting appropriated values of the parameters.

Considering, for example, a federation of DLT networks where the rate of malicious nodes compared to honest nodes is below the 60% (a typical, and in many case extreme, scenario in decentralized environments), in order to optimally operate the system and reach a level of data integrity in the federation trust of over the 99%, a possible recommendation will be to configure the system with the following parameters:

Redundancy of control blocks (Kc) equal to 3, being the optimal interval of values to accommodate different scenarios of malicious nodes and reach optimal results in the range [2, 5].

The period of the control block does not have a significant impact in the result of the data integrity, so any value around the order of a minute would make the system work optimally. In an embodiment, it is recommended using a value in the range of 30 seconds and 5 minutes, according to the performance requirements of the network.

Finally, for the Kl, it is proposed a liveness check with Kl=2, optimally, with any value between 1 and 3 being suitable without harming the operation of the system; and a liveness period (Tl) of Kl*Tc (the Tc selected for the control block generation period). This gives values of $\alpha_{loss}$ around 0.01, so it provides a good result.

The system would also work in scenarios with a higher rate of malicious nodes, but the configuration proposed wouldn't ensure the 99% probability. Nonetheless, this scenario where there are decentralized networks with over a 60% in the rate of malicious nodes is rare.

In the above explained embodiments, it has been considered a redundancy of Kc networks (number of networks storing the control blocks) and that this redundancy has to be kept throughout all the operation of the system. However, as in many blockchain and DLT technologies, this requirement may be relaxed so that instead of ensuring no forgery over the Kc control blocks received, it is ensured for example no 51% attack, i.e. instead of ensuring the reception of Kc or Kl ACKs to be sure that there is enough redundancy and liveliness of control blocks, the requirement may be relaxed to at least a number of ACKs>Kc/2. Thus, in an embodiment, a network will wait preferably to Kc ACKs, but if this is not possible instead of keep retransmitting, it will settle to, for example, at least more than Kc/2 ACKs (that is, in the embodiment, if the selected Kc is too high and it is not possible to wait to Kc ACKs, Kc is then decreased to Kc/2).

Some of the different protocols and schemes in the proposed protocol stacks are optional. Thus, for a network to implement embodiments of the present invention it doesn't have to use the full protocol stack, and it can select the ones that better fits is purpose. For example, a network could choose to relax its trust requirements, and use the control block broadcasting scheme, and the resource discovery system, and avoid the use of the liveliness and congestion control algorithms.

In the above explained embodiments, it has been presented the case of the Trust Detection Index to objectively measure the level of trust and integrity over a network, but modifications of this metric or other metrics could be used. As for example, a Trust Validation Index, which instead of determining to what extent an error can be detected in the data of the network, it also introduces the extent in which errors can be detected and fixed.

The description and drawings merely illustrate the principles of the invention.

Although the present invention has been described with reference to specific embodiments, it should be understood by those skilled in the art that the foregoing and various other changes, omissions and additions in the form and detail thereof may be made therein without departing from the scope of the invention as defined by the following claims. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A method for enhancing the performance of at least one Distributed Ledger Technology, DLT, network of a group of independent DLT networks connected by one or more communications networks, the method comprising the following steps performed by a computing node of at least one of the DLT networks of the group, a first DLT network:

a) transmitting a generated control block to one or more computing nodes of N other DLT networks of the group, wherein N being greater than or equal to 2, (N≥2), where each control block at least contains Proof of History information of the computing node of the first DLT network; and going to step b);

b) receiving by the computing node of the first DLT network, through the one or more communications networks, at least a confirmation message from one or more computing nodes of the N other DLT networks of the group, where a computing node of any of the other DLT networks transmits a confirmation message after having received the control block from the computing node of the first DLT network, validated it and added it to a distributed ledger;

c) after Tc transactions of the computing node of the first DLT network, determining whether the confirmation messages received in step b) have been received from at least Kc different DLT networks of the group, where Tc and Kc is a design parameters of the first DLT network and, if so, generating a new control block, and going to step a) for transmission of the newly generated control block; and, where the method further comprises:

every Tl transactions of the computing node of the first DLT network, where Tl is a design parameter of the first DLT network, transmitting a message to other DLT networks of the group requesting at least one previously transmitted control block, where said message is transmitted to the computing nodes of the DLT networks from which a confirmation message has been previously received for said at least one previously transmitted control block; and if, during a certain period of time, successful reply messages to the request are received from less than Kc different DLT networks, retransmitting said at least one previously transmitted control block to one or more computing nodes of N other DLT networks of the group.

2. A method according to claim 1, where Tc, Kc and Tl are selected according to a level of trust required in the first DLT network.

3. A method according to claim 1, where Tc, Kc and Tl are selected according to a value of Detection Trust Index, DTI, required in the first DLT network, where the Detection Trust Index is defined as:

$$DTI = 1 - \left[ \sum_{i=0}^{Kc-1} \frac{\left(\frac{p}{q}\right)^i * e^{-\left(\frac{p}{q}\right)}}{i!} + \frac{Tl}{Kl} * \alpha_{loss} * \sum_{i=0}^{Kl-1} \frac{\left(\frac{p}{q}\right)^i * e^{-\left(\frac{p}{q}\right)}}{i!} \right]$$

where Kl is the number of previous control blocks requested to the other DLT networks, $\alpha_{loss}$ is the probability of loss of a stored control block in a network and p/q is the ratio between honest computing nodes and malicious computing nodes.

4. A method according to claim 1, where if, in step c) it is determined that confirmation messages have been received from less than Kc different DLT networks of the group, no new control block is generated and going to step a) for transmission of the previously generated control block.

5. A method according to claim 1, where if, in step c) it is determined that confirmation messages have been received from less than Kc different DLT networks of the group, reducing the value of Kc and going to step a).

6. A method according to claim 1 where to generate the Proof of History information, a Sparse Merkle multiproofs technique is used.

7. A method according to claim 1 where the Proof of History is built at least taking into account the transactions generated in the first network computing node since the previous control block was transmitted.

8. A method according to claim 7, where the Proof of History is built taking also into account the content of the previous control block.

9. A method according to claim 1, where a control block also contains at least one of the following contents: Identification of the computing node in the first network that has generated the control block or the total number of blocks in the first network until the generation of the control block or the total number of control blocks already generated by said first DLT network or ID of the previous control block.

10. A method according to claim 1 where the first DLT network stores the confirmation messages received and the confirmation messages include one or more of the following: an address of the computing node receiving the control block or the type of DLT network which has received the control block or a timestamp of the confirmation message or a signature of the sender of the confirmation message.

11. A method according to claim 3, where the value of Kl is in the range [1-3].

12. A method according to claim 1 where the value of Kc is in the range [2-5] or the value of Tc=2.

13. A system for enhancing the performance of Distributed Ledger Technology, DLT networks, the system comprising a group of independent DLT networks connected by one or more communications networks, where at least one computing node of at least one of the DLT networks of the group, a first DLT network, comprises a processor configured to:
- transmit a generated control block to one or more computing nodes of N other DLT networks of the group, wherein N being greater than or equal to 2, (N≥2), every Tc transactions of the first DLT network computing node, where Tc is a design parameter; where a newly generated control block is transmitted only if it is a first control block transmitted or if it is determined that the previous control block has been validly transmitted;
- and where each control block at least contains Proof of History information of the first network computing node;
- receive, through the one or more communications networks, at least a confirmation message from one or more computing nodes of the N other DLT networks of the group, where a computing node of any of the other DLT networks transmits a confirmation message after having received the control block from the computing node of the first DLT network, validated it and added it to a distributed ledger;
- where it is determined that the control block has been validly transmitted if the confirmation messages have been received from at least Kc different DLT networks of the group, where Kc is a design parameter of the first DLT network; and
- every Tl transactions of the computing node of the first DLT network, where Tl is a design parameter of the first DLT network, transmitting a message to other DLT networks of the group requesting at least one previously transmitted control block, where said message is transmitted to the computing nodes of the DLT networks from which a confirmation message has been previously received for said at least one previously transmitted control block; and if, during a certain period of time, successful reply messages to the request are received from less than Kc different DLT networks, retransmitting said at least one previously transmitted control block to one or more computing nodes of N other DLT networks of the group.

14. A non-transitory digital data storage medium for storing a computer program which comprises instructions causing a computer executing the program to perform the method according to claim 1.

* * * * *